United States Patent [19]

Böhme et al.

[11] Patent Number: 4,626,059
[45] Date of Patent: Dec. 2, 1986

[54] CONNECTING ARRANGEMENT FOR CURRENT CONDUCTORS HAVING FULL SOLID INSULATION

[75] Inventors: Klaus Böhme; Günter Seibt; Klaus Sieber, all of Dresden, German Democratic Rep.

[73] Assignee: VEB "Otto Buchwitz", Dresden, German Democratic Rep.

[21] Appl. No.: 693,238

[22] Filed: Jan. 22, 1985

Related U.S. Application Data

[63] Continuation of Ser. No. 427,373, Sep. 29, 1982, abandoned.

[30] Foreign Application Priority Data

Aug. 20, 1981 [DD] German Democratic Rep. ... 232695

[51] Int. Cl.⁴ ............................................ H01R 13/46
[52] U.S. Cl. .............................. 339/143 C; 339/92 M
[58] Field of Search .................. 339/92 R, 92 M, 111, 339/143 R, 143 C, 5 R; 179/73 R

[56] References Cited

U.S. PATENT DOCUMENTS 2,857,557 10/1958 Imhof ...................................... 317/9
3,980,374 9/1976 Fallot ................................ 339/92 R

FOREIGN PATENT DOCUMENTS 1295052 5/1969 German Democratic Rep. .

OTHER PUBLICATIONS

Freitag, W: Eine Neue Feststoffisolierte Schalanlage fur 30, 33 und 35 kV Nennspannung, Published by: VEM Elektroanlagebau, 3rd year, vol. 2, 6/67, pp. 50-53.
K. Boehme: Die Optimierten Feststoffisolierten 36-kV Schaltzellen Typ ASIF 36, Published by: ELEKTRIE 28 (1974), vol. 10, pp. 533-538.
A. Imhof:Uber Neue Konzeptionen und Werkstoffe der Hochspannungstechnik Publ. by: STZ, Bern, Switzerland, 2/58, vol. 6, pp. 93-120.

Primary Examiner—Eugene F. Desmond
Attorney, Agent, or Firm—Gabriel P. Katona

[57] ABSTRACT

Connecting points of fully solid material insulated conductors in the form of a fully solid material insulated hollow body, which is provided on the inside with a shield and in which at least a pair of current conductor inputs are arranged, is intended preferably for application in the high voltage switching and distribution equipments. The object and aim of the invention is to provide a coupling point which enables the increase of the operational reliability, the reduction of the complexity of assembly, servicing and repairing operations, as well as the coupling of offset or branching-off current conductors.

According to the invention, this is accomplished by constructing the hollow body substantially rigid and that the current conductor inputs are constructed as lead-out openings and/or as current conductor inputs with fixedly encased current conductors, that the hollow body is provided with at least one service opening which in each case is electrically sealed with a cover and in that the hollow body contains force, positive or material type locking of current conducting coupling between at least two current conductors (FIG. 1).

8 Claims, 4 Drawing Figures

CONNECTING ARRANGEMENT FOR CURRENT CONDUCTORS HAVING FULL SOLID INSULATION

This is a continuing application of application Ser. No. 427,373, filed on Sept. 29, 1982, now abandoned.

FIELD OF THE INVENTION

The connecting arrangement for fully solid material insulated current conductors according to the present invention is preferably relates to a coupling which is capable of carrying current at sufficient electrical insulating capacity between the fully solid material insulated conductors and components in high voltage switching and distribution equipment. As a result there is the possibility to use it either in or on a self-contained electrotechnical equipment.

BACKGROUND OF THE INVENTION

It is generally known that in fully soild material insulated high voltage switching and distribution equipment, the bus bars and the equipment of the main current path which are provided with an insulating cover from a solid insulating material including outer shield from, for example, a grounded conducting layer, are coupled and interconnected over separable connecting points.

As it is known from WP52449 a necessary insulating capability of a fully solid material insulated connecting point is achieved in that, an air gap which is created between the fully solid material insulated bus bars or equipment, becomes electrically sealed with an insulating material having higher electrical stability by being spanned by an elastic insulating material.

Furthermore, it is known from WP82981, a radially mountable conductor train which can be arranged between two fixed points and having a solid material insulation, more specifically, a bus bar for high voltage switching equipment, which comprises the combination of a separable elastic connecting point, a separable rigid connecting point and a rigid solid material insulated conductor arranged between the two connecting points. The conductor ends are formed as lugs and individually are surrounded by axially displacable contactor segments which are assembled each into a hollow cylinder, wherein the necessary contactor pressure is produced by an insulating material ring which is spanned or compressed between the insulation of the conductor ends.

Furthermore, there is known, a connecting point for solid material insulated rigid conductors, especially for bus bars, from WP60081, in which, on both sides, in the conductor ends which are provided with drilled holes on their front sides, pressed balls under spring action are held, which bring about the electrical connection of the current conducting conductor over a slotted contact sleeve. Between the solid material insulation of the conductors there is an elastic insulating ring arranged, which is held by two limit rings. The connecting point is spanned by means of annular springs, metallic threaded rings and by a metallic threaded sleeve arranged on the solid material insulation. From the present prior art technique a substantial disadvantage comes to light in that the coupling of fully solid material insulated current conductors and component joints which are capable of carrying high currents cannot be made or checked before the air gaps are sealed off by spanning, in order to attain the necessary electrical insulating capacity.

Inasmuch as in the known solutions, after the sealing of the air gap the access to the current conductor ends is not possible and during the sealing procedure the access with tools to the current conductor ends is very limited as far as space is concerned, in a practical application, the connecting methods which are especially suited for the attainment of a low contact transition resistance, such as bolt connection, pressing, soldering, welding or coupling by clamping pieces, will be eliminated.

Therefore, inescapably one must fall back on arrangements which are not beneficial for the current transition, such as on contact lamellae pressed by spring force or on segments. Under these conditions it becomes insignificant whether the contact force is produced by spanned elastic synthetic materials (WP82981) instead of by springs. For example, according to WP60081, the contact force is produced by the spanning or compression during the sealing of the gaps. Not only that the actually produced contact force and the spatial position of the connecting elements due to the inescapable tolerances of the individual components cannot be ascertained anymore, the danger is present that although the spanning will guarantee a sufficient insulating capability for the gap sealing, the contact forces for the current transition will not be produced to the required extent. Also during the heat effects influencing the fully solid insulated bus bars, the spanning and consequently the contact pressure will change in an extent beyond control. This disadvantage will not be eliminated even by the solution offered by the radially mountable solid material insulated conductor train according to WP82981, inasmuch as also here, the contact force of the lamellae will be produced first only by the compression of spanning of the gaps during sealing. A further disadvantage of the above-mentioned technical solution resides in that the connecting points can be mounted only with a pair of current conductor ends in the same axis, but not under an angle or by branching off.

The last mentioned disadvantage will be partially removed by the switching equipment known from DE-AS 1295052, disclosing a switching equipment for high operating voltage having fully insulated encapsulation of the bus bar components and branch conductors in each phase. In this switching equipment the bus bar components and the branching-off conductors which are encapsulated exclusively in solid insulating material are lead into a branching-off housing comprising an insulating synthetic material having a certain elasticity while electrical gaps are created, and in which housing the bus bar components are electrically coupled with each other and with the branch-off conductors by means of annular spring contacts arranged on a coupling element. For the distribution of the electric field in the elastic branching-off housing a elastic shield electrode is built into. The elastic branching-off housing serves especially the purpose to compensate the longitudinal expansion of the bus bars during heat effect.

In addition that such elastic branching-off housing is technologically extremely difficult to realize, such solution further has a disadvantage, that the current carrying coupling is created only after the sealing off of the gaps and, that the seating of the contact elements and their contact pressure which depends from the inescapable tolerance conditions and displacement, cannot be controlled anymore, in that the annular spring contacts can be used only which are not quite suitable for the transition of high currents and are relatively complex and, that in order to reduce the contact transition resistance by suitable coupling methods, such as by bolt connection, pressing, welding, such methods cannot be used. In addition, such connecting point cannot be varied in order to be useable for all kinds of branching-off conductors.

A further disadvantage resides in that the supervision and repair on the couplings is possible only after disassembling the entire bus bar and branching-off arrangement.

OBJECT OF THE INVENTION

The object of the invention is to provide a connecting arrangement for a fully solid material insulated current conductor which is capable of providing an increased operational reliability and which reduces the complexity of mounting, supervising and repair works involved.

SUMMARY OF THE INVENTION

The aim of the present invention is to provide a connecting arrangement for fully solid insulated current conductors in the form of a fully solid insulated hollow body, which on the inside is provided with a shield and in which there are arranged at least two current conductor-inputs wherein the current carrying capability can be realized and controlled before sealing off of the connecting arrangement and wherein the seat of the connecting elements as well as their contact force, that is, the contact transition resistance are independent from the compression or spanning of the gap sealing which is to attain a sufficient insulating capability of the connecting point and which can be supervised. A further aim of the invention is to provide a coupling for displaced or branched-off current conductors.

The aim is solved according to the invention in that the fully solid material insulated hollow body is constructed substantially rigid and that the current conductors-inputs are constructed as lead-out openings and/or as current conductor-inputs with fixedly encased current conductors and, that the hollow body is provided with at least one service opening which is electrically sealed with a cover and, that in the hollow body there are provided force locked, positive or material locked current conducting couplings between at least two current conductors.

On the lead-out opening between the fully solid material insulated hollow body and the fully solid material insulated current conductor or a joined apparatus, an elastic electrically sealed compensator is provided.

The current conductor inputs are so arranged that it is possible to have couplings having the same axis, axially displaced, under an angle, T-formed, cross-shaped or three dimensional types of couplings for the current conductors.

For three dimensional couplings the hollow body is constructed as a partially hollow body and is rotatably coupled with at least another partial hollow body and wherein between the adjacent hollow bodies there is provided an elastic and electrically insulating compensator.

DESCRIPTION OF THE PREFERRED EMBODIMENTS

The connecting point of fully solid material insulated current conductors according to the invention will be described in more detail with respect to the drawings.

Figure 1:
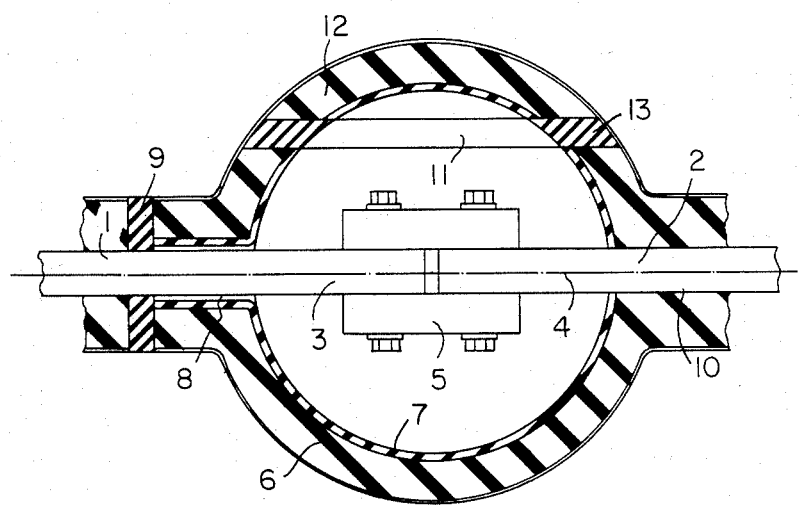
Figure 2:
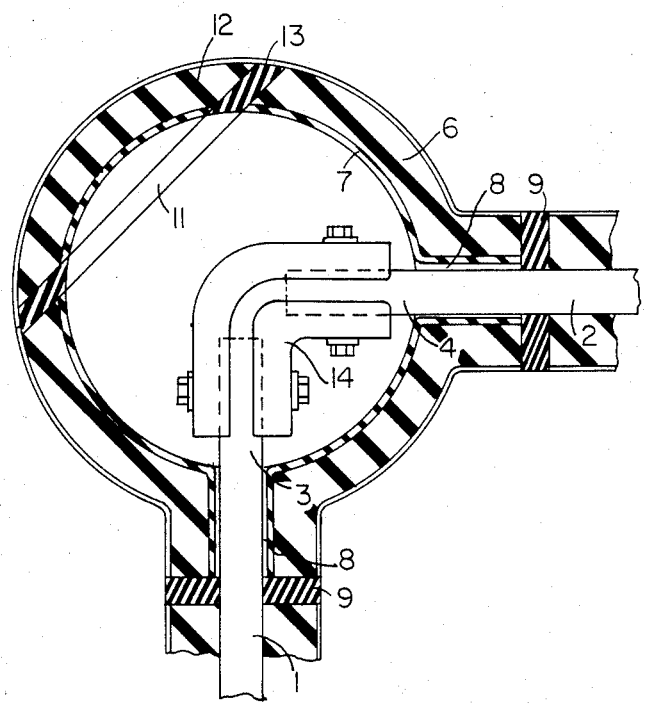
Figure 3:
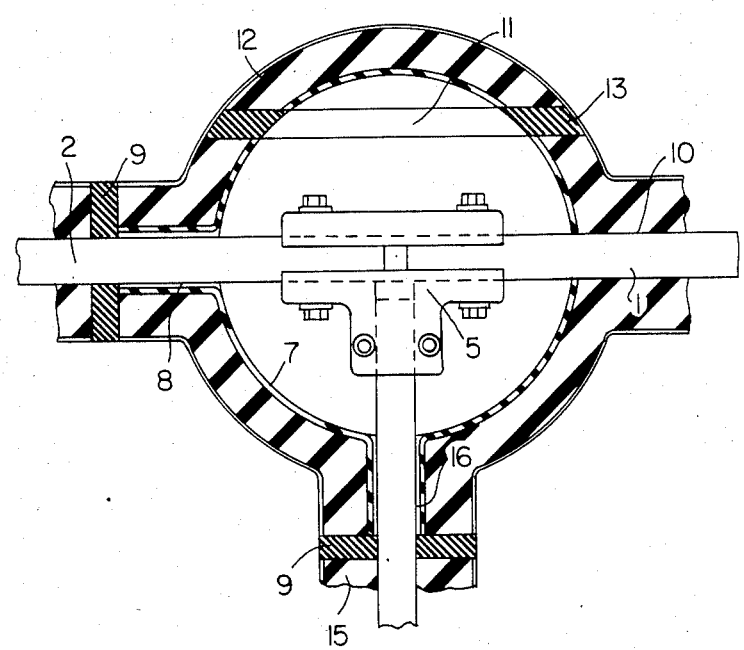
Figure 4:
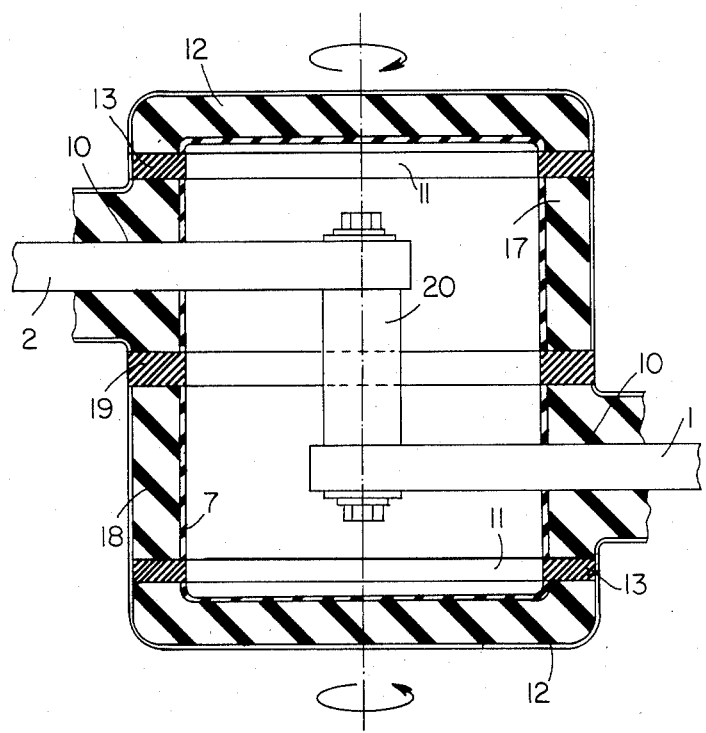

Each of the drawings are illustrated in cross-section:
FIG. 1 is a connecting point of fully solid material insulated current conductors having a common axis;
FIG. 2 is a connecting point to fully solid material insulated current conductors arranged at an angle;
FIG. 3 is a connecting point of fully solid material insulated current conductors arranged in a T-form;
FIG. 4 is a connecting point of fully solid material insulated current conductors which are arranged three-dimensionnally.

With reference to FIG. 1, a connecting point of two fully solid material insulated current conductors 1,2 or equipment is shown, the current conducting ends 3, 4 of which are arranged in a common axis. Both current conductor ends 3,4 are coupled with each other by means of a current conducting contact joint 5 which is arranged in a rigidly constructed fully solid material insulated body 6 the inner upper surface of which is provided with a shield 7 lying on the potential of both current conductor ends 3, 4. The hollow body 6 can take other than the illustrated spherical form, namely any suitable geometrical form. The current conducting contact coupling 5 is preferably illustrated as a bolted clamping coupling, it can, however, be in other suitable forms such as force, material or positive type of couplings. The fully solid material insulated hollow body 5 is provided with a lead-out opening 8 in the shape of a current conductor input, through which the current conductor end 3 of the current conductor 1 coming from the left protrudes. This current conductor 1 is arranged on the hollow body 6 with the help of a spanned elastic compensator 9 which takes up the heat expansions and, at the same time, serves also as an electrical gap sealing means. Similarly, other means can be used also for the gap sealing. The current conductor end 4 which is coming from the right is preferably positively coupled in a second current conductor input 10 in which it is securely encased whereby the fully solid material insulated conductor 2 and the hollow body 6 form bodily a unit. The hollow body 6 in addition is provided with a service opening 11 for the access of checking and establishing the current carrying contact coupling 5 and, is closed with a cover 12 and, with a gap sealing 13 and, it is electrically sealed. Instead of the cover 12 one may similarly perform the closure and the electrical sealing of the service opening 11 by other suitable insulating members. Through the service opening 11 is attained that the establishment and the subsequent servicing or checking of the current carrying contact coupling 5 of the current conductors 3, 4 can be performed from the outside and, before the coupling point is electrically sealed, so that there is no considerable influence presented by the gap sealing 13 of the service opening 11 on the current carrying capability of the contact coupling 5 of the current conductors 3 and 4.

The coupling point according to the present invention is variable depending from the spacewise arrangement as well as from the number of the current conductors and of the branching-off conductors.

FIG. 2 illustrates a connecting point suitably constructed for current conductors arranged under an angle. The current conductor ends 3, 4 are offset under an angle and lead into the fully solid material insulated hollow body 6 provided with a shield 7 and are coupled through a material locked coupling 14. The electrically sealed service opening 11 is constructed from the viewpoint of good accessiblity required for the material type locking coupling method, in such a manner, that the cover 12 has a dimension to meet such requirement.

Both current conductor inputs are constructed as lead-out openings 8. For the electrical sealing as well as for the compensation of the heat expansion of both of the protruding current conductor ends 3, 4, a compensator 9 is arranged between the hollow body 6 and the fully solid material insulated conductor 1, 2 on each side. It is also possible to securely encapsulate the current conductor ends 3, 4 of the fully solid material insulated conductors 1, 2 or components within the current conductor inputs.

The connecting point according to FIG. 3 is constructed for a current conductor coupling having a T-shape. With the fully solid material insulated current conductors 1, 2 and coupled along the same axis, a third fully solid state material insulated current conductor 15 is coupled which is arranged with respect to them at an angle. Accordingly, the solid material insulated and shielded at 7 hollow body 6 is provided with a third current conductor input 16, whereby in a preferred manner, two of the current conductor inputs are formed as lead-out opening 8, 16 and one current conductor 10 is constructed with a fixedly encased current conductor 1. The volume of the cover 12 of the service opening 11 corresponds approximately to the connecting arrangement according to FIG. 1.

For a three dimensional coupling of fully solid material insulated current conductors and/or fully solid material insulated components, the variation illustrated in FIG. 4 is provided for a connecting arrangement according to the invention. The fully solid material insulated hollow body which is also provided with a shield 7 is constructed as a hollow body 17 which is coupled with another hollow body 18. Both the preferably cylindrically shaped hollow bodies 17,18 are coupled rotatably by means of an elastic and electrically sealing compensator 19. Each of the hollow bodies 17,18 is provided with a service opening 11 which is electrically sealed with a cover 12 and a gap sealing 13. The current conductor input of each of the hollow bodies 17, 18 is preferably material locked with the fully solid material insulated current conductors 1, 2 and their ends 3, 4, so that they form bodily a unit. The current conductor input 10 can, however, be constructed also as a lead-out opening. Both current conductor ends are coupled with each other by means of a current conducting force locked coupling 20, which enables the necessary rotational movement of the partial bodies 17, 18 and, thereby, of the current conductors 1, 2 and/or of the component.

The construction of the connecting arrangement according to the present invention in the form of a rigid hollow body enables the use of force, positive or material locking-type couplings of fully solid material insulated current conductors which especially are suitable for carrying high current, such type of couplings being the bolt, press, soldering, welding and clamping-type couplings. The establishment of the current carrying coupling of the current conductors is performed through an open cover and through the service opening. After the current conducting coupling has been made, the service opening is closed by the cover and by means of the electrically sealing gap sealing means. The electrical sealing of the lead-out opening as well as of the cover has no considerable influence on the current carrying capability, that is, on the contact pressure and on the contact resistance.

In addition, the coupling arrangement according to the present invention enables also, in a simple manner, to perform the eventually required supervision, servicing and repairs whenever necessary.

We wish it to be understood that we do not desire to be limited to the exact details of construction shown and described, for obvious modifications will occur to a person skilled in the art.

Having thus described the invention, what we claim as new and desire to be secured by Letters Patent, is as follows:

1. A coupling arrangement for fully solid material insulated current conductors in very high voltage or current applications wherein the danger of corona discharge is present; comprising a fully solid material insulated hollow body, a shield provided on the inside of said body, at least a pair of input means for said current conductors, said hollow body is constructed substantially rigid, at least one of said input means for said current conductors is constructed as a pass-through opening, the other of said input means being constructed as a solid insulator embedding the associated current conductor, said current conductors being led-through or fixedly encased in respective ones of said openings of said input means, said hollow body comprises at least one service opening and a cover therefor, means for electrically sealing and shielding said cover to said opening in a selectively removable fashion, and for providing a shielding structure for said cover against corona formations between said conductors and said cover, said current conductors having end portions formed to provide for force, positive or material locking-type current conducting coupling between said pair of current conductors, said coupling being accessible from said service opening for supervising, servicing, assemblying or disassemblying operations, wherein on said input means and between said fully solid material insulated hollow body and the fully solid material insulated current conductor in said input means or a component joint, there is provided an elastic electrically sealing compensator means for allowing for heat compensation of said conductors.

2. The coupling arrangement according to claim 1, wherein said current conductor input means are arranged in said hollow body at locations enabling straight axis coupling of the current conductors.

3. The coupling arrangement according to claim 1, wherein said current conductor input means are arranged in said hollow body at locations enabling axially displaced coupling of the current conductors.

4. The coupling arrangement according to claim 1, wherein said current conductor input means are arranged in said hollow body at locations enabling coupling of the current conductors at an angle.

5. The coupling arrangement according to claim 1, wherein said current conductor input means are arranged in said hollow body at locations enabling T-shaped coupling of the current conductors.

6. The coupling arrangement according to claim 1, wherein said current conductor input means are arranged in said hollow body at locations enabling cross-shaped coupling of the current conductors.

7. The coupling arrangement according to claim 1, wherein said current conductor input means are arranged in said hollow body at locations enabling three dimensional coupling of the current conductors.

8. The coupling arrangement according to claim 7, wherein said hollow body for the three dimensional coupling is formed as a partial hollow body and coupled with at least another partial hollow body in a rotatable fashion, wherein between the adjacent partial hollow bodies an electrically sealing compensator is provided.

* * * * *